US008458738B2

(12) United States Patent
Shusman

(10) Patent No.: US 8,458,738 B2
(45) Date of Patent: Jun. 4, 2013

(54) METHOD AND APPARATUS FOR GENERATING AN INTERACTIVE RADIO PROGRAM

(75) Inventor: Chad W. Shusman, West Conshohocken, PA (US)

(73) Assignee: MediaIP, Inc., Rydal, PA (US)

( * ) Notice: Subject to any disclaimer, the term of this patent is extended or adjusted under 35 U.S.C. 154(b) by 0 days.

(21) Appl. No.: 12/699,001

(22) Filed: Feb. 2, 2010

(65) Prior Publication Data

US 2010/0227546 A1    Sep. 9, 2010

Related U.S. Application Data

(60) Division of application No. 11/728,220, filed on Mar. 23, 2007, now Pat. No. 7,673,317, which is a continuation of application No. 10/374,733, filed on Feb. 25, 2003, now abandoned.

(51) Int. Cl.
*H04N 7/173* (2006.01)

(52) U.S. Cl.
USPC .................. 725/24; 725/60; 725/61; 725/63; 715/734

(58) Field of Classification Search
USPC .................. 725/24, 91, 98, 114, 136, 60–68, 725/73, 74, 81, 105; 715/733, 734; 348/14.01, 348/468
See application file for complete search history.

(56) References Cited

U.S. PATENT DOCUMENTS

| | | | | |
|---|---|---|---|---|
| 2,629,645 | A * | 2/1953 | Schwerin | 346/17 |
| 5,740,035 | A | 4/1998 | Cohen et al. | |
| 6,014,569 | A * | 1/2000 | Bottum | 455/466 |
| 6,211,869 | B1 | 4/2001 | Loveman et al. | |
| 6,347,183 | B1 * | 2/2002 | Park | 386/261 |
| 6,618,853 | B1 * | 9/2003 | Ohyama et al. | 717/109 |
| 6,938,069 | B1 * | 8/2005 | Narayanaswamy | 709/204 |
| 7,013,290 | B2 * | 3/2006 | Ananian | 705/27 |
| 7,143,089 | B2 * | 11/2006 | Petras et al. | 707/749 |
| 2001/0047516 | A1 | 11/2001 | Swain et al. | |
| 2002/0012322 | A1 * | 1/2002 | Rooney | 370/252 |
| 2002/0042293 | A1 * | 4/2002 | Ubale et al. | 463/9 |
| 2002/0085030 | A1 * | 7/2002 | Ghani | 345/751 |
| 2002/0138582 | A1 * | 9/2002 | Chandra et al. | 709/206 |
| 2002/0165024 | A1 * | 11/2002 | Puskala | 463/40 |
| 2002/0183059 | A1 * | 12/2002 | Noreen et al. | 455/427 |
| 2003/0005432 | A1 * | 1/2003 | Ellis et al. | 725/13 |
| 2003/0078972 | A1 * | 4/2003 | Tapissier et al. | 709/204 |
| 2003/0135860 | A1 * | 7/2003 | Dureau | 725/82 |
| 2003/0172343 | A1 * | 9/2003 | Leymaster et al. | 715/500 |
| 2003/0227479 | A1 * | 12/2003 | Mizrahi et al. | 345/753 |
| 2004/0044677 | A1 | 3/2004 | Huper-Graff et al. | |
| 2004/0143603 | A1 * | 7/2004 | Kaufmann et al. | 707/104.1 |
| 2004/0153504 | A1 * | 8/2004 | Hutchinson et al. | 709/204 |
| 2006/0293971 | A1 * | 12/2006 | Hunter et al. | 705/26 |
| 2007/0233514 | A1 * | 10/2007 | Kido et al. | 705/1 |

* cited by examiner

*Primary Examiner* — Dominic E Rego
(74) *Attorney, Agent, or Firm* — Christie, Parker & Hale, LLP

(57) ABSTRACT

A method and system for the creation of interactive radio programming. A moderator of an interactive radio program uses a moderator client to digitize and transmit a radio program with enhanced content to a moderator server through a wide area network. The moderator server uses the digitized radio program and the enhanced content to generate an interactive radio program for transmission to participants in the interactive radio program. The complete interactive radio program is transmitted to participant clients over the wide area network. An audio portion of the interactive radio program may be transmitted over a conventional radio network as well.

7 Claims, 10 Drawing Sheets

METHOD AND APPARATUS FOR GENERATING AN INTERACTIVE RADIO PROGRAM

CROSS-REFERENCE TO RELATED APPLICATION(S)

This application is a divisional of application Ser. No. 11/728,220 filed Mar. 23, 2007, now U.S. Pat. No. 7,673,317, which claimed the benefit of the filing date of U.S. patent application Ser. No. 10/374,733, now abandoned, filed Feb. 25, 2003, the disclosure of which are incorporated fully herein by reference.

BACKGROUND OF THE INVENTION

This invention pertains generally to the field of interactive programming and more specifically to creating interactive programming for transmission over a radio and computer network.

Radio has traditionally been a serial process where a radio program is broadcast to a listener in an audience with limited opportunities, such as calling in over a phone line to talk to a talk show host, for the listener to participate in the radio program. The evolution to a more interactive form of radio, or radio where the listener is allowed to participate, has been slow given the lack of bidirectional communication channels between the listener and the radio program broadcaster. When bidirectional communication channels were created, they tend to be of insufficient bandwidth for communication of complex listener interactions with the radio program.

Development of a nearly ubiquitous communications network, namely the Internet, has greatly expanded the use of interactive radio. However, listener participation has so far been limited to choosing radio content, responding to advertising messages, and answering viewer questionnaires or polls. This is primarily because most interactive radio programming follows a conventional radio paradigm wherein the radio programming is wrapped in advertisements; and the only responses needed from an audience are to listen to linear pre-recorded programs and to buy advertised items or services. Little has been done to fully involve the audience in a rich participatory experience where the audience has as much control and influence over the content of an interactive program as the originator of the interactive program. This is in contrast to the expectations of some listeners who want a richer and more satisfying participatory experience within the context of an interactive program.

Some interactive radio formats also have a disadvantage in that, although they may use the Internet as a bidirectional communication channel, the interactive radio format is dependent upon set-top-boxes and middleware that a listener either purchases or leases from a broadcaster such as a cable operator. While these devices may have a variety of functional features, they may require an additional expenditure that a listener or a Multiple Systems Operator (MSO) may not want to incur, especially if the listener already has an Internet-enabled device such as a home computer. This makes most existing interactive radio programming "heavy" in the sense that specialized hardware is needed to take advantage of the interactive content embedded in an interactive programming signal. Additionally, the combination of a required set-top-box and specialized interactive radio formats make interactive programming distributed over an interactive radio network difficult to integrate with conventional Web content such as Web pages available from a Web site.

Therefore, a need exists for a lightweight interactive programming system allowing for rich listener participation that is easily integrated with existing Web content. The present invention meets such need.

SUMMARY OF THE INVENTION

A method and system for the creation of interactive radio programming is provided. A moderator of an interactive radio program uses a moderator client to digitize and transmit a radio program with enhanced content to a moderator server through a wide area network. The moderator server uses the digitized radio program and the enhanced content to generate an interactive radio program for transmission to participants in the interactive radio program. The complete interactive radio program is transmitted to participant clients over the wide area network. An audio portion of the interactive radio program may be transmitted over a conventional radio network as well.

In one aspect of the invention, a method of creating and transmitting an interactive radio program includes operably coupling a moderator server to a moderator client and a plurality of participant clients through a communications network. The moderator server receives participant comments from the plurality of participant clients and transmits the participant comments to the moderator client. The moderator server also receives a digitized audio source from the moderator client. The moderator server uses the participant comments and the digitized audio source to generate an interactive radio program and transmits the interactive radio program to the plurality of participant clients the interactive radio program.

In another aspect of the invention, generating an interactive radio program further includes receiving enhanced content by the moderator server from the moderator client through the communications network and generating by the moderator server the interactive radio program using the enhanced content, participant comments, and the digitized audio source.

In another aspect of the invention, the interactive radio program further includes an audio portion that is transmitted by the moderator server through a radio network by the moderator server.

In another aspect of the invention, the participant comments further include an interactive radio program audience approval rating.

In another aspect of the invention, the moderator server receives from the moderator client a participant exclusion signal corresponding to a specific participant client from the plurality of participant clients and generates the interactive radio program using the participant exclusion signal in order to exclude participant comments received from the specific participant client.

In another aspect of the invention, a moderator is provided with a user interface permitting the moderator to select a participant question to answer while viewing participant comments. The user interface includes a participant comments portion for display of comments made by participants in the interactive radio program and a question display portion for display of questions asked by participants in the interactive radio program.

In another aspect of the invention, the question display portion of the user interface further includes a plurality of question fields, with each question field including a participant name subfield a question text subfield an answer selection icon, and a delete question icon.

In another aspect of the invention, the participant comment portion of the user interface further includes a plurality of participant comment records, with each participant comment record including a participant name field, and a participant comment field.

In another aspect of the invention, the user interface of further includes an audience approval rating display portion permitting a moderator to view an audience approval rating submitted by the participants in the interactive radio program. The audience approval rating display portion has a color-coded meter for display of the interactive radio program's current audience approval rating and a time graph for display of the interactive radio program's audience approval rating as a function of time.

In another aspect of the invention, the user interface further includes a status indicator portion indicating the status of the interactive radio program. The status indicator portion has a number field for displaying a sequence number associated with the interactive radio program, a name field for display of a name associated with the interactive radio program, and an online audience display field for display of the number of participants currently participating in the interactive radio program.

In another aspect of the invention, the user interface has a participant poll display portion for display of poll results received from participants.

DETAILED DESCRIPTION

Interactive radio programs are a subset of interactive programs in general. For example, interactive programs may be created for transmission as a television signal, or may be distributed over a wide area network such as the Internet. In one system for creating interactive programming incorporating participant interactions in accordance with an exemplary embodiment of the present invention, the interactive programs are talk shows hosted by independent moderators and delivered to an audience via the Internet. This system allows a moderator to be recognized as an expert or respected voice in a particular field while building a community of listener participants interested in that particular field. The system allows the moderator to create a controlled and moderated environment where the moderator directs the flow of information and has complete control over the medium. The system is cost-effective because no special hardware or training is needed to operate the system. The system features a customizable Web-based interface for moderators and participants to use in creating customized collaborative interactive radio programs. The system is described in detail in U.S. patent application Ser. No. 10/123,618 the contents of which are hereby incorporated by reference as if fully stated herein.

Figure 1:
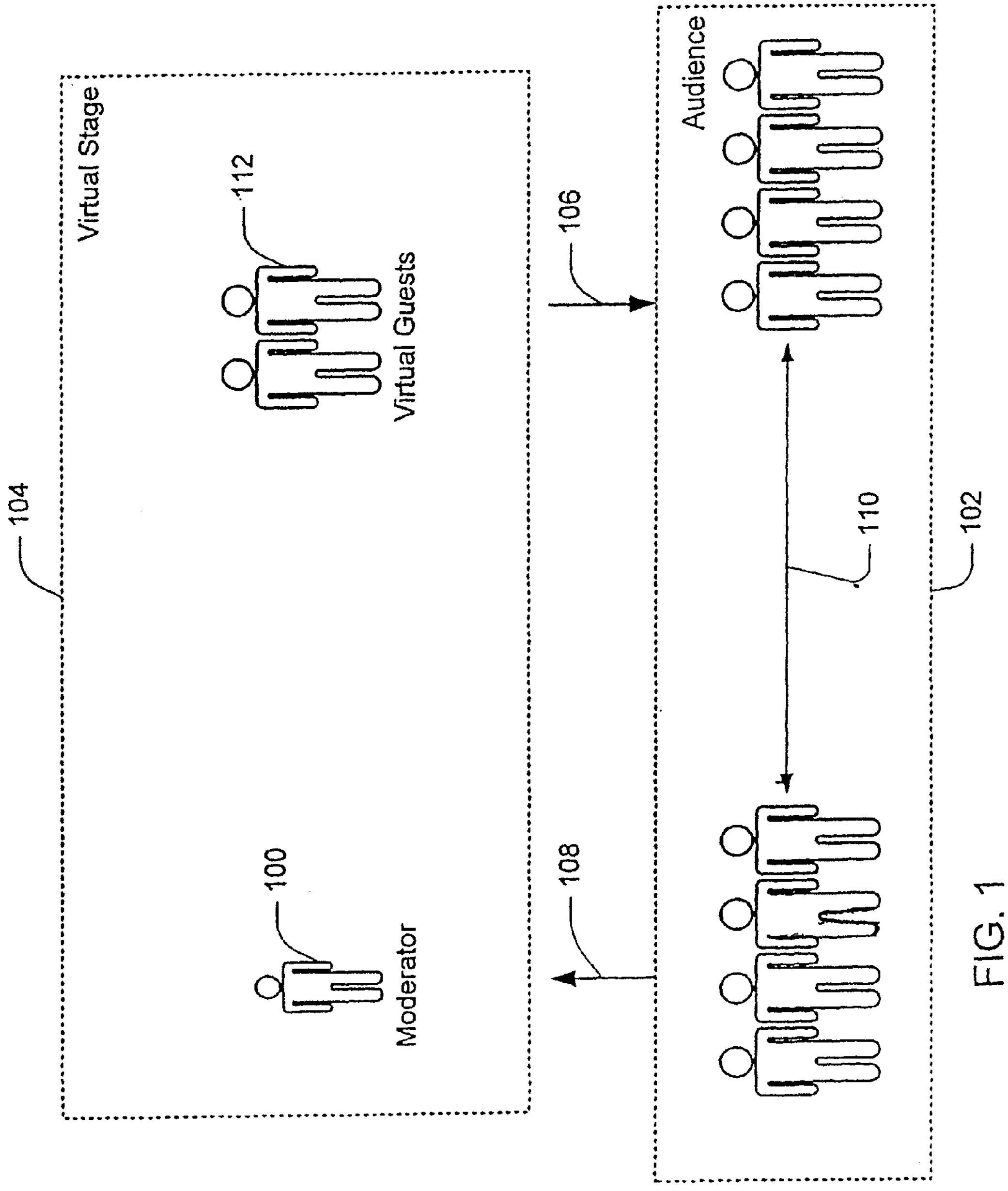
FIG. 1 is a conceptual diagram of a system for creating an interactive program incorporating participant interactions in accordance with an exemplary embodiment of the present invention.

FIG. 1 is a conceptual diagram of a system for creating an interactive radio program incorporating participant interactions in accordance with an exemplary embodiment of the present invention. A moderator 100 hosts an interactive radio program, such as a broadcast program with a talk show format, which is transmitted to an audience having a plurality of listeners 102. The interactive radio program takes place on a virtual stage 104 where the moderator generates interactive radio programming for transmission to the listeners. The moderator transmits the interactive radio program 106 to the listeners. The listeners may passively listen to the interactive radio program or may become active participants by generating their own comments 108 that are transmitted back to the moderator. The moderator edits or filters the participant comments and retransmits the edited participant comments as part of the interactive radio program. The listeners may communicate with each other during the interactive radio program by exchanging audience messages 110 between themselves.

The moderator controls the content of the interactive radio program in a variety of ways. The moderator introduces the initial topic or content for audience interaction. For example, the moderator may introduce a topical event such as a news story and then ask for participant comments. The moderator may also use previously prepared content such as a non-interactive radio program that is transmitted to the audience in order to elicit audience member responses and engage listeners. The moderator can invite virtual guests 112 from the audience onto the virtual stage. While on the virtual stage, the virtual guests exchange interactive messages directly with the moderator rather than with other audience members or participants. The moderator may also exclude a participant or listener from the audience. Additionally, the moderator may generate additional interactive radio programming for use by the audience such as polls so that the audience can participate in the interactive radio program by selecting responses to a question from a list of answers. The results of the participant responses are aggregated for inclusion in the interactive radio program.

Figure 2:
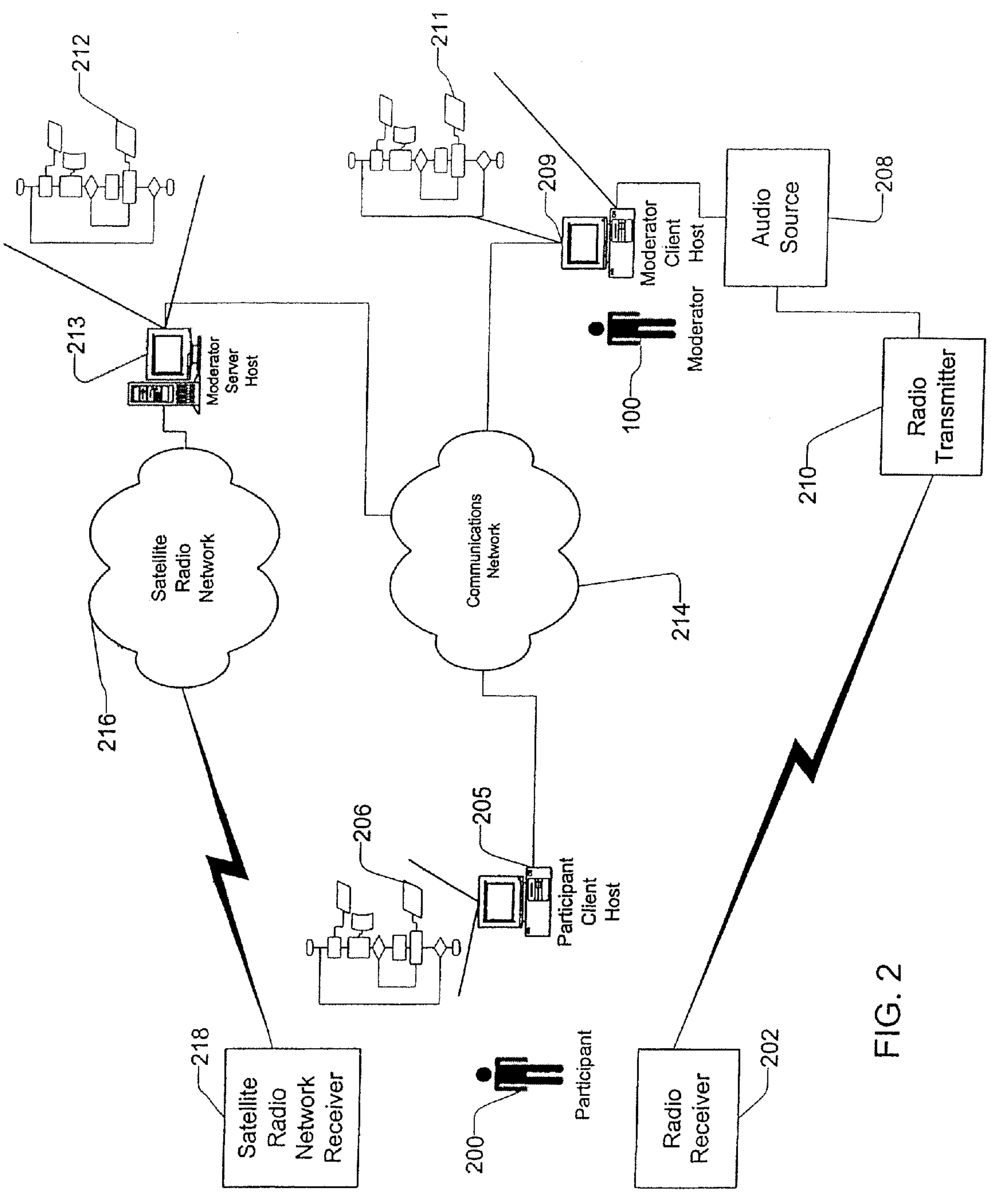
FIG. 2 is a block diagram depicting a system for distribution of interactive radio programming in accordance with an exemplary embodiment of the present invention.

FIG. 2 is a block diagram depicting a system for distribution of interactive programming using radio wave transmissions in accordance with an exemplary embodiment of the present invention. A moderator 100 may use the system to distribute an interactive radio program to a plurality of participants, such as participant 200. The interactive radio program can include an audio portion, such as a moderator's spoken views on a particular subject, and include an interactive portion, such as participant comments either on the show or on the topic of the show. As the interactive radio program can include an audio portion that is separable from the interactive portion, the audio portion of the interactive radio program may be delivered as part of a media stream separate from the interactive portion. For example, the participant may receive audio portions of the radio program via a radio receiver 202 or satellite radio receiver 218 and interact with interactive components of the interactive radio program using a participant client 206, such as a Web browser, hosted by a participant client host 205.

In slightly more detail, the moderator creates a radio program by generating an audio signal using a microphone and audio mixing board 208 or the like. The output of the audio mixing board is then used as an audio source that is transmitted to a radio transmitter 210 and broadcast to the radio receiver. The audio source is also transmitted to a moderator client 211, such as a Web browser, hosted by a moderator client host 209 that is coupled to a moderator server host 213 hosting a moderator server 212 via a communications network such as the Internet. The moderator client digitizes the audio source using an Analog to Digital Converter (ADC) and transmits the digitized audio source to the moderator server through the communications network. The moderator may also use the moderator client to transmit enhanced content that is created by the moderator to add interactive components to the audio source. For example, the moderator may add advertising links to an interactive radio program for use by the participant. The moderator server uses the received digitized audio source and the received enhanced content to generate an interactive radio program that may be transmitted to the participant in a variety of ways.

In one system for distribution of an interactive radio program in accordance with an exemplary embodiment of the present invention, the moderator server uses a satellite radio network 216 to transmit the audio portions of the interactive radio program to the participant's satellite radio receiver 218. The participant may then listen to the audio portions of the interactive radio program using the satellite radio receiver and interact with the interactive portion of the interactive radio program using the participant client.

In another system for distribution of interactive programming using radio wave transmissions in accordance with an exemplary embodiment of the present invention, the moderator server generates an interactive radio program that may be distributed to the participant over the communications network. In this system, the audio portions of the interactive radio program and the enhanced content are transmitted through the communications network to the participant client. A participant uses the participant client to listen to and interact with the interactive radio program.

Figure 3:
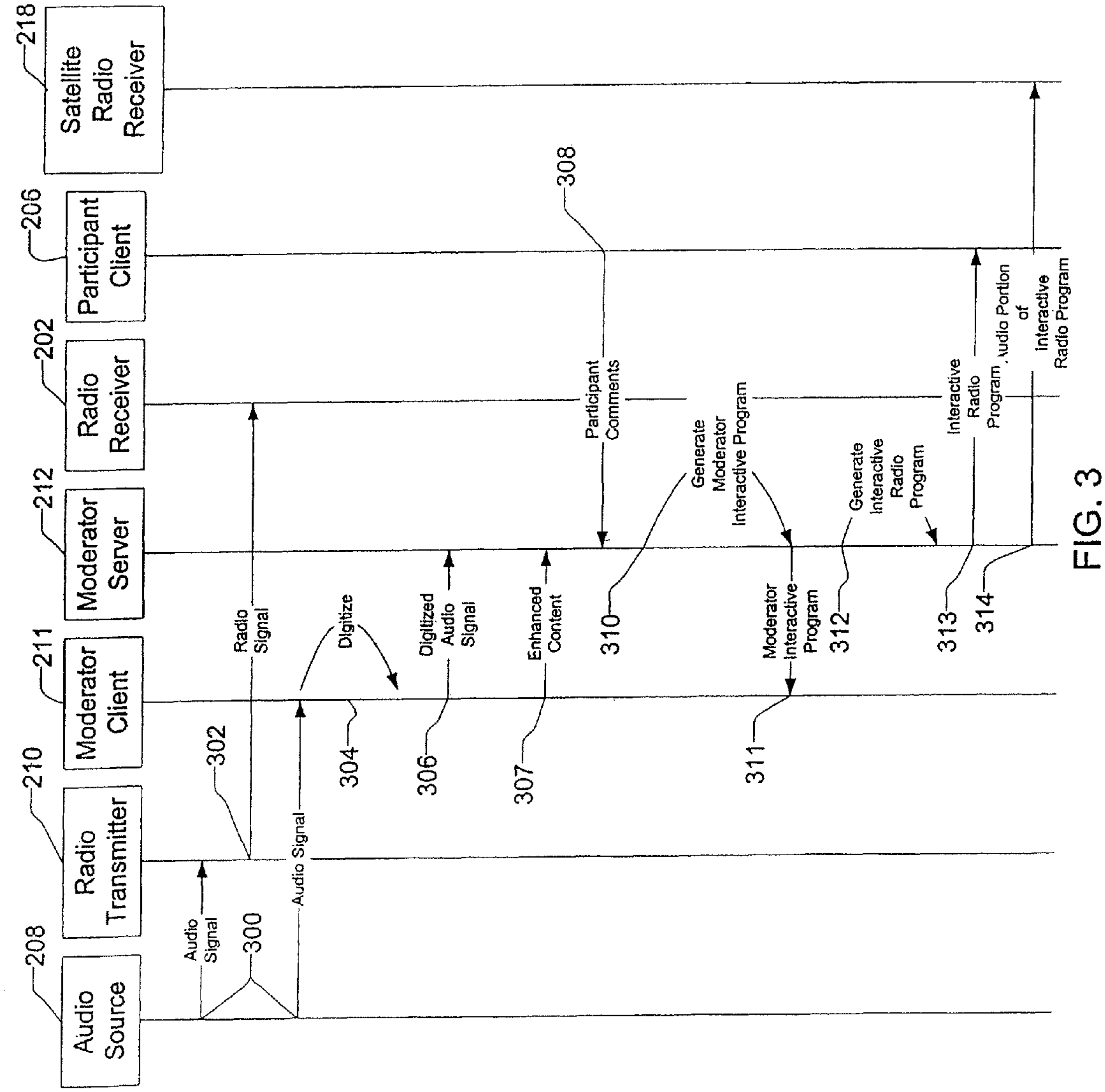
FIG. 3 is a sequence diagram depicting transmission of interactive radio programming within a system for distribution of interactive radio programming in accordance with an exemplary embodiment of the present invention.

FIG. 3 is a sequence diagram depicting transmission of an interactive radio program in accordance with an exemplary embodiment of the present invention. An audio source 208 transmits an audio signal 300 to a radio transmitter 210 for transmission as a radio signal 302 to a radio receiver 202. The audio signal includes an audio portion of an interactive radio program. A participant may then listen to the audio portion of the interactive radio program using the radio receiver but may not be able to access any interactive portions of an interactive radio program.

The audio signal is also transmitted to a moderator client 211 that digitizes (304) the audio signal and transmits the digitized audio signal 306 to a moderator server 212. The moderator client also transmits enhanced content 307 to the moderator server. The moderator server also receives participant comments 308 from a participant client 206. The participant comments include questions asked by a participant of a moderator, participant responses to questions asked by the moderator of the participant, such as polls, participant messages intended for display to other participants, and audience approval ratings.

The moderator server uses the digitized audio signal as an audio portion of an interactive radio program, combines the audio portion of an interactive radio program with the enhanced content and the participant comments to generate (310) a moderator interactive program including a moderator user interface 311 that is transmitted to the moderator client 211. The moderator server also generates (312) an interactive radio program 313 including an audio portion and an interactive portion using the digitized audio signal, the enhanced content, and the participant comments. The moderator server then transmits the interactive radio program to the participant client.

In one system for distribution of interactive programming using radio wave transmissions in accordance with an exemplary embodiment of the present invention, the moderator server uses a satellite radio network to transmit audio portions 314 of an interactive radio program to the participant's satellite radio receiver 218. The participant may then listen to the audio portions of the interactive radio program using the satellite radio receiver.

Figure 4:
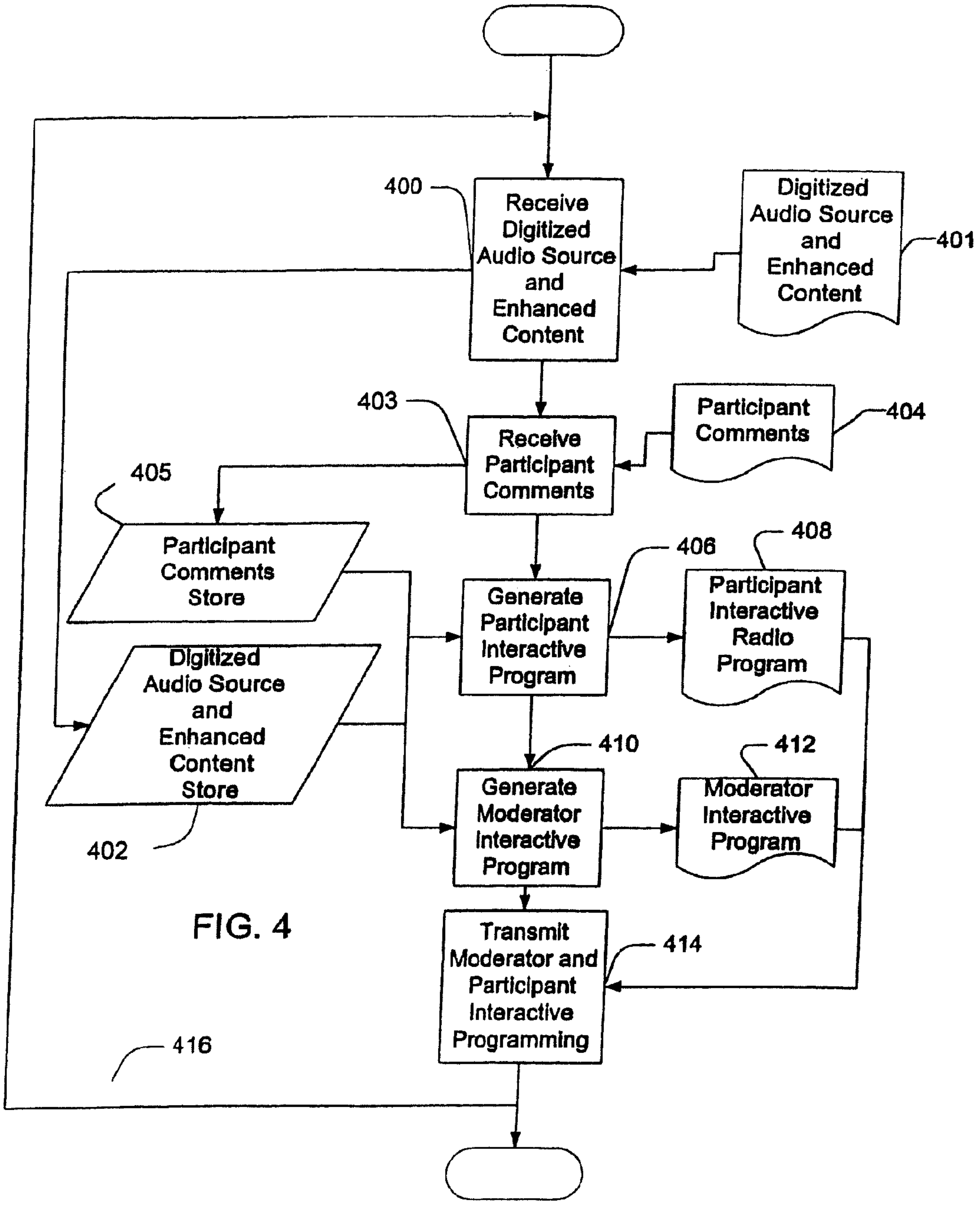
FIG. 4 is a process flow diagram of an interactive radio program generation process in accordance with an exemplary embodiment of the present invention.

FIG. 4 is a process flow diagram of an interactive radio program generation process in accordance with an exemplary embodiment of the present invention. A moderator server receives (400) a digitized audio source and enhanced content 401 from a moderator client, and places the digitized audio source and enhanced content in a temporary data store 402. The moderator server also receives (403) participant comments 404 from participants in an audience of the interactive radio program and places the participant comments in a temporary data store 405. The moderator server uses the participant comments, the digitized audio source, and enhanced content to generate (406) a participant interactive radio program 408 for transmission to participants in the audience. The moderator server also uses the participant comments to generate (410) a moderator interactive program 412 for transmission to the moderator. The moderator server then transmits (414) the moderator interactive program to the moderator client and the participant interactive radio program to the participants in the audience. The process is repeated 416 indefinitely to generate an ongoing interactive radio program.

Figure 10:
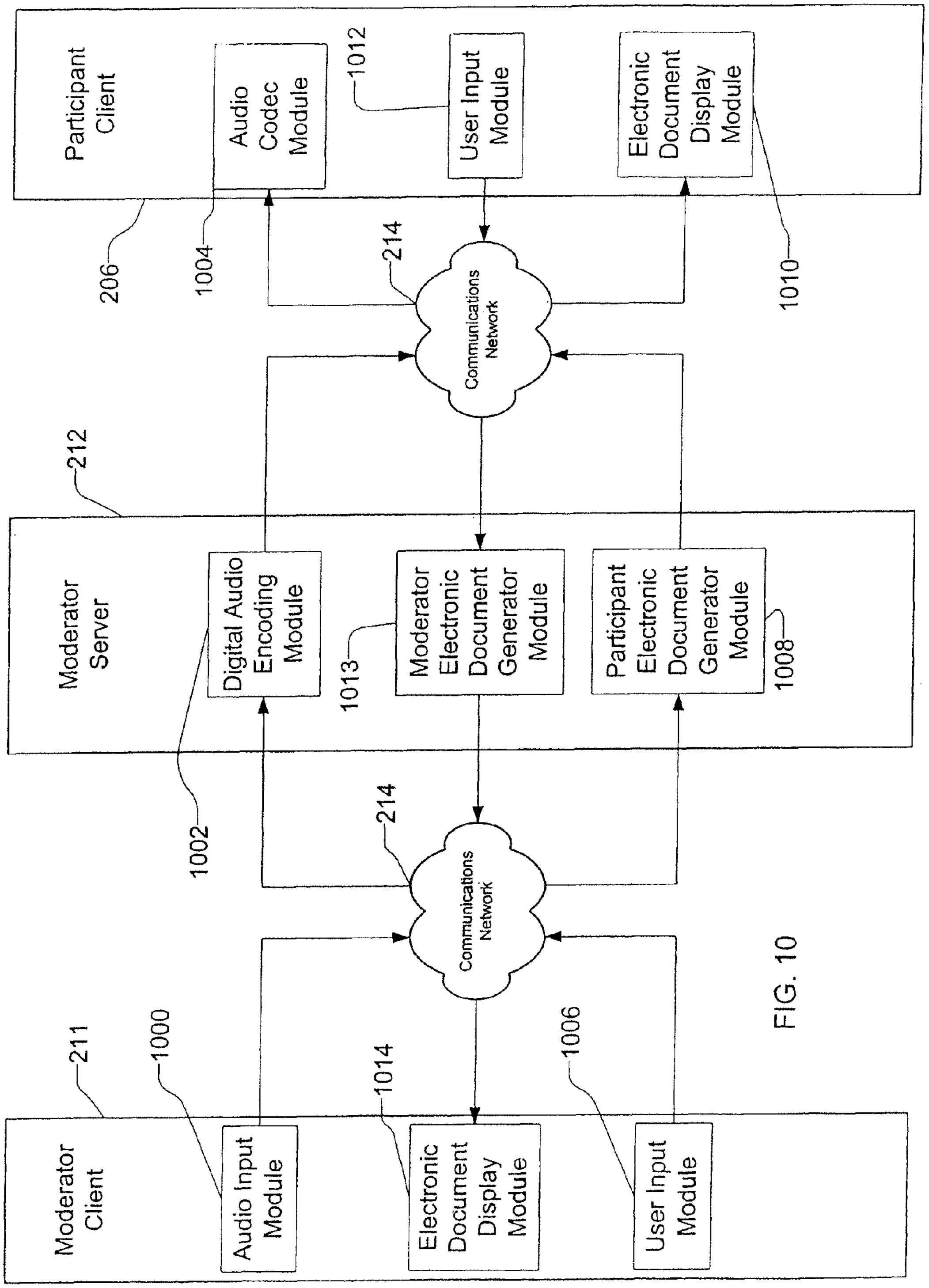
FIG. 10 is a software architecture diagram of distributed software modules within a system for distribution of interactive radio programming in accordance with an exemplary embodiment of the present invention.

FIG. 10 is a software architecture diagram of distributed software modules for generation and display of interactive radio programming within a system for distribution of interactive radio programming in accordance with an exemplary embodiment of the present invention. A moderator client 211 includes an audio input software module 1000 for receiving an audio source input from a moderator, digitizing the audio source, and transmitting the digitized audio source through a communications network 214 to a moderator server 212. The moderator server includes an audio encoding module 1002 that receives the digitized audio source from the moderator client and encodes the digitized audio source for transmission through the communications network to a participant client 206. The participant client includes an audio codec 1004. A codec is a software module for compressing and decompressing data, such as a codec that can decode audio data encoded using the well-known MPEG-3 standard for audio. The participant client receives the encoded digitized audio source and uses the audio codec to decode the encoded digitized audio source for presentation to the participant.

The moderator client also includes a user input module 1006 for receiving user inputs from the moderator, such as textual inputs from a keyboard, and transmission of the moderator user inputs through the communications network to the moderator server. The moderator server includes a participant electronic document generator software module 1008 that receives the moderator user inputs from the moderator client and uses the moderator user inputs to generate an electronic document that is transmitted through the communications network to the participant client. The participant client receives the electronic document and uses an electronic document display module 1010 to display the electronic document to the participant.

The participant client further includes a user input module 1012 for receiving user inputs from the participant, such as textual inputs from a keyboard, and transmission of the participant user inputs through the communications network to the moderator server. The moderator server includes a moderator electronic document generator software module 1013 that receives the participant user inputs from the participant client and uses the participant user inputs to generate an electronic document that is transmitted through the communications network to the moderator client. The moderator client receives the electronic document and uses an electronic document display module 1014 to display the electronic document to the moderator.

In one system for distribution of interactive radio programming in accordance with an exemplary embodiment of the present invention, the moderator client and participant clients are Web browsers, the communications network is the Internet, and the Web browsers communicate with the moderator server by requesting and receiving electronic documents written in a document markup language such as Hyper Text Markup Language (HTML). The audio input module 1000 of the moderator client and audio codec module 1004 of the participant client are both plugins for their respective Web browsers. The electronic document generators of the moderator server are server scripts or servlets that generate HTML documents for serving to their respective Web browsers. The user input modules of the participant client and the moderator client are applets running within the clients that manage encoding user inputs into appropriate requests for transmission to the moderator server.

Figure 5:
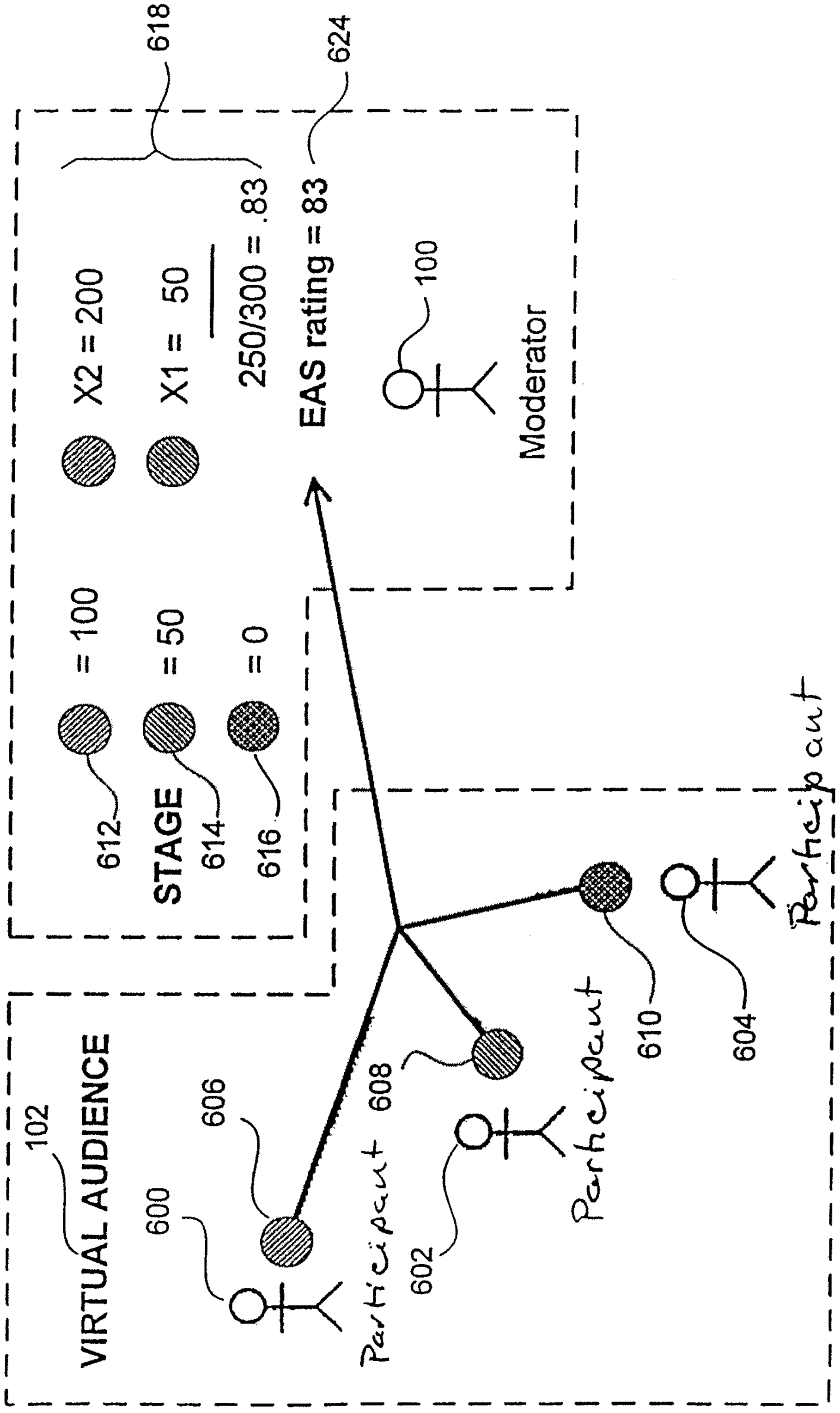
FIG. 5 is a diagram depicting a process for receiving participant reactions to an interactive program and calculating an audience approval system rating for the interactive program in accordance with an exemplary embodiment of the present invention.

Referring now to FIG. 5 a diagram depicting a process for receiving participant reactions to the interactive program and calculating an audience approval system rating for an interactive program in accordance with an exemplary embodiment of the present invention is shown. A moderator 100 generates an interactive radio program and transmits the interactive radio program to an audience 102 as previously described. The audience includes a plurality of participants, as exemplified by participants 600, 602, and 604. Each participant may have a different opinion of the quality of the interactive radio program; therefore, each participant is provided with an individual audience approval system button, such as the audience approval rating radio buttons, 524, 526, and 528 of FIG. 7, as exemplified by audience approval system buttons 606, 608, and 610. Each participant selects an audience approval system rating button corresponding to the participant's subjective rating of the interactive program. The selection of an audience approval system button transmits a corresponding audience approval system signal to the moderator server (not shown) thus creating a plurality of audience approval system signals for evaluation by the moderator server. The moderator server receives the plurality of audience approval system signals, uses them to generate a single audience approval system rating signal, and transmits the audience approval system rating signal for display on the moderator's interface (not shown).

In an audience approval system in accordance with an exemplary embodiment of the present invention, an audience approval system signal can take on three states, 612, 614, and 616, with each state representing a participant's subjective opinion of the interactive program. In this embodiment, the three states are mapped to the corresponding numeric values of "100", "50", and "0", with "100" representing a participant's complete satisfaction with the interactive program, "50" representing the participant's partial satisfaction with the interactive program, and "0" representing the participant's complete dissatisfaction with the interactive program. Each of the plurality of audience approval system signals are mapped to one of these numeric values. These numeric values are used to generate an arithmetic mean representing the audience approval system rating of the interactive program. In the illustrated example of FIG. 5, participant 600 rates the interactive program at "100", participant 602 rates the interactive program at "50", and participant 604 rates the interactive program at "100". These values are used by the moderator server to generate (618) an arithmetic mean 624 of the plurality of mapped participants' audience approval system signals. The arithmetic mean is presented to the moderator as the audience approval system rating of the moderator's interactive program. In one audience approval system in accordance with an exemplary embodiment of the present invention, the audience approval system rating is mapped to a color, with the numeric value of "100" being represented in green, the numeric value of "50" being represented in yellow, and the numeric value of "0" being represented in red.

Figure 6:
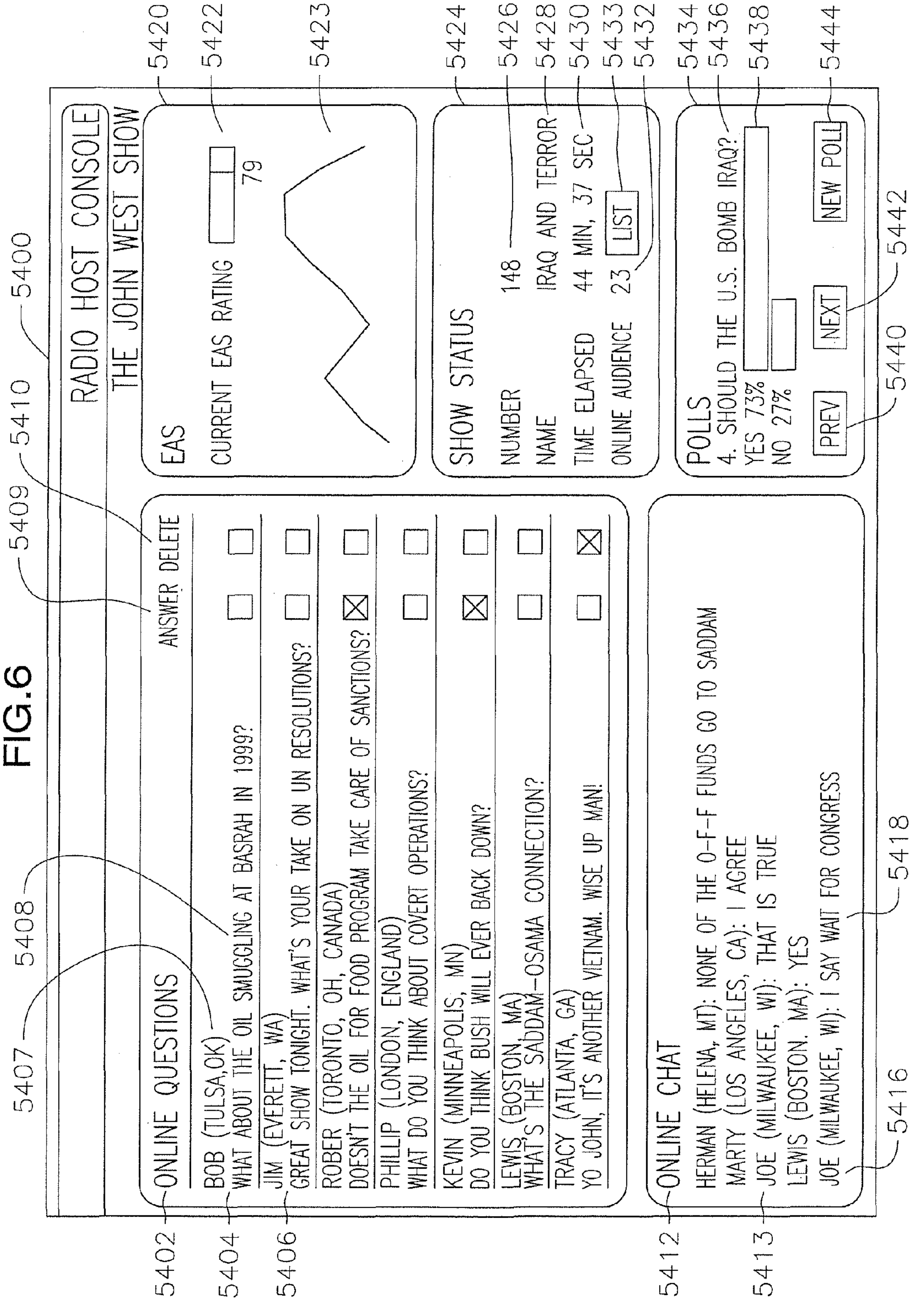
FIG. 6 is an illustration of a moderator's user interface for creation of an interactive program for distribution using radio wave transmissions in accordance with an exemplary embodiment of the present invention.

FIG. 6 is an illustration of a moderator's user interface for creation of an interactive radio program for distribution using radio wave transmissions in accordance with an exemplary embodiment of the present invention. A moderator user interface 5400 includes a question display portion 5402 for display of questions received by a moderator from participants. The question display portion includes fields for displaying a plurality of questions, such as questions 5404 and 5406. Each question field includes a participant name subfield, such as participant name subfield 5407, and a question text subfield, such as question text subfield 5408. Each question field further includes an "Answer" selection icon, such as answer selection icon 5409, and a "Delete" selection icon, such as delete selection icon 5410. If a moderator selects an answer selection icon associated with a question, the question is included in a list of questions that the moderator will answer during the course of generating the interactive radio program. If a moderator selects a delete selection icon associated with a question, the question is deleted from the question portion and the commentator never answers the question.

The moderator user interface further includes a participant comments portion 5412 for display of comments received from participants in the interactive radio program. Comments are displayed in a plurality of participant comment records, such as participant comment record 5413. Each participant comment record includes a participant name field, such as participant name field 5416, for display of a participant's identifier associated with a participant's comment, and a participant comment field, such as participant comment field 5418 for display of a participant's comment.

The moderator user interface further includes an audience approval rating display portion 5420 for display of audience approval rating information received from the participants as previously described. The audience approval rating display portion includes a color-coded meter 5422 for display of an interactive radio program's current audience approval rating and a time graph 5423 for display of an interactive radio program's audience approval rating as a function of time.

The moderator user interface further includes a status indicator portion 5424 used to indicate the status of the interactive radio program to the moderator. The status indicator portion includes a "Number" field 5426 for displaying a sequence number associated with an interactive radio program that is currently being generated. The status indicator portion further includes a "Name" field 5428 for display of a name associated with the current interactive radio program and a "Time Elapsed" field 5430 for display of the elapsed time that the current interactive radio program has been generated. Finally, the status indicator portion includes an "Online Audience" display field 5432 for display of the number of audience members currently participating in the interactive radio program. A moderator may select a "List" selection icon 5433 to display a list of the audience members.

The moderator user interface further includes a poll display portion 5434 for display of poll results received from the audience members. The poll display portion includes a poll question field 5436 for display of a poll question, a poll result field 5438 for display of poll results in graphical and numerical formats, a "Prev" selection icon 5440 for selecting a previous poll in a list of polls to view, a "Next" selection icon 5442 for selection of a next poll in a list of polls to view, and a "New Poll" selection icon 5444. A moderator selects the "New Poll" selection icon to enter a new poll question in a list of polls.

In one system for distribution of interactive programming using radio wave transmissions in accordance with an exemplary embodiment of the present invention, the moderator user interface is an electronic document such as a Web page distributed over the Internet. The Web page is displayed by a browser to the moderator and the moderator interacts with the Web page in order to generate an interactive radio program.

Figure 7:
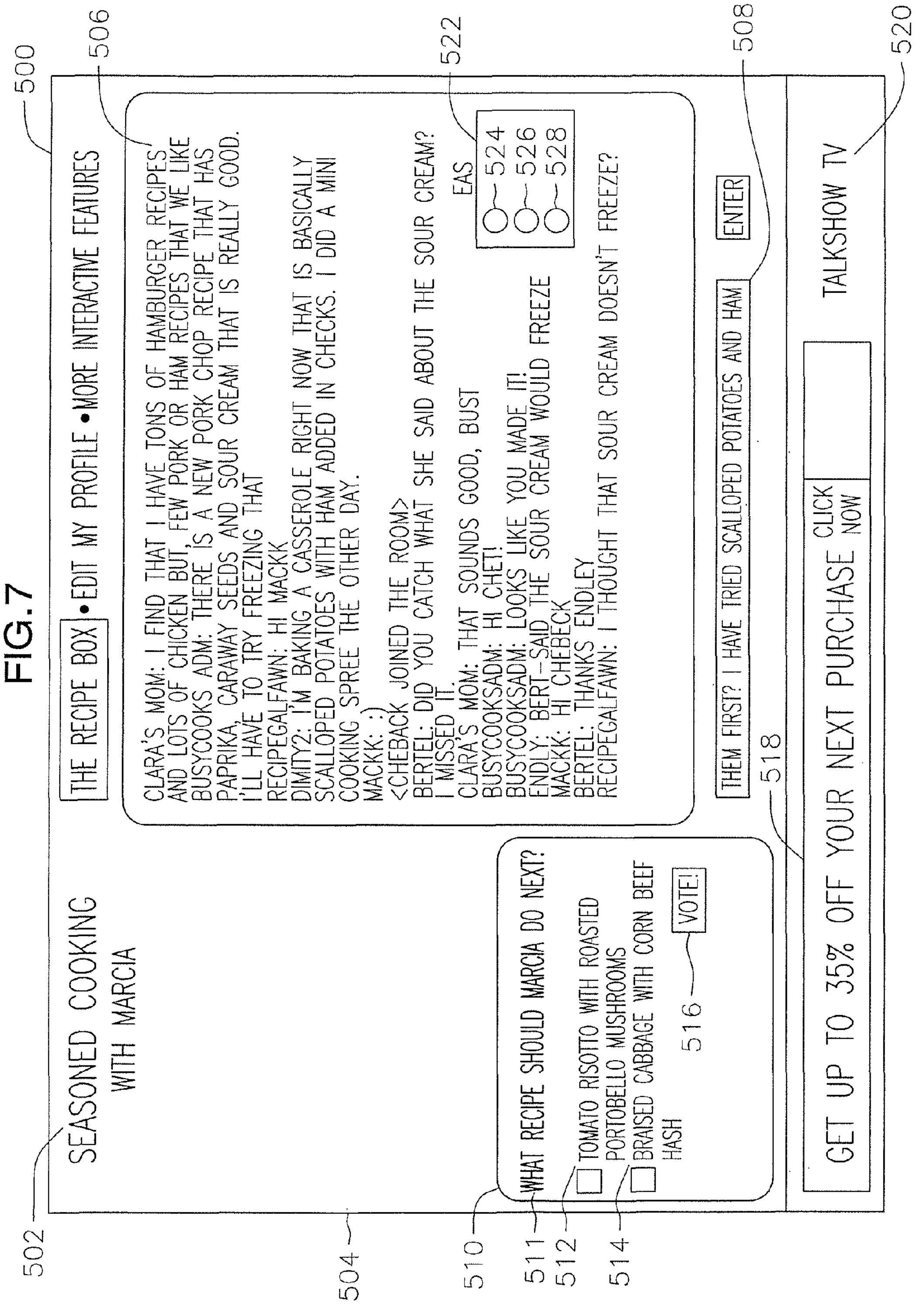
FIG. 7 is a screen capture of a participant's interface used to view and interact with an interactive program in accordance with an exemplary embodiment of the present invention.

FIG. 7 is a screen capture of a participant interface used to view and interact with an interactive radio program in accordance with an exemplary embodiment of the present invention. The participant interface 500 includes an interactive radio program identifier field 502 for display of the name of the interactive radio program being listened to by the participant. A participant interactive message section 506 is included for display of participant messages that the participants are exchanging amongst themselves. An interactive message entry field 508 is used by the participant to enter interactive messages for display in the participant message section and to interact with the moderator when the moderator invites the participant onto the virtual stage.

A poll section 510 displays a poll question 511 asked by the moderator of the participants. The poll section includes a plurality of response buttons, exemplified by response buttons 512 and 514, selectable by the participant to indicate the participant's response to the poll. The participant selects an answer to the poll question by selecting one of the response buttons and then selects the "Vote!" button 516 to register the participant's poll answer with the moderator server. The participant interface further includes sections for banner advertising 518 and for placement of a trademark or service mark 520 to identify the operator of the moderator server. By allowing banner ads, the moderator server allows a moderator to collect revenue from t-commerce interactions with the moderator's hosted interactive radio program.

In another embodiment of an interactive radio program creation system in accordance with the present invention, a poll is created using a plurality of participant questions for selection by participants. The participant question from the plurality of participant questions receiving the most participant selections is selected for submission to the moderator.

An audience approval system rating entry field 522 is provided for entry of a participants' rating of an interactive program. The audience approval system rating entry field includes a plurality of radio buttons, 524, 526, and 528, for entry of the participants' rating. Selecting a first radio button rates the interactive radio program as highly entertaining, selecting a second radio button rates the interactive radio program as moderately entertaining, and selecting a third radio button rates the interactive radio program as only mildly entertaining.

In one system for distribution of interactive programming using radio wave transmissions in accordance with an exemplary embodiment of the present invention, the participant user interface is an electronic document such as a Web page distributed to participants over the Internet. The Web page is displayed by a browser to the participant and the participant interacts with the Web page in order to interact with the interactive radio program.

Figure 8:
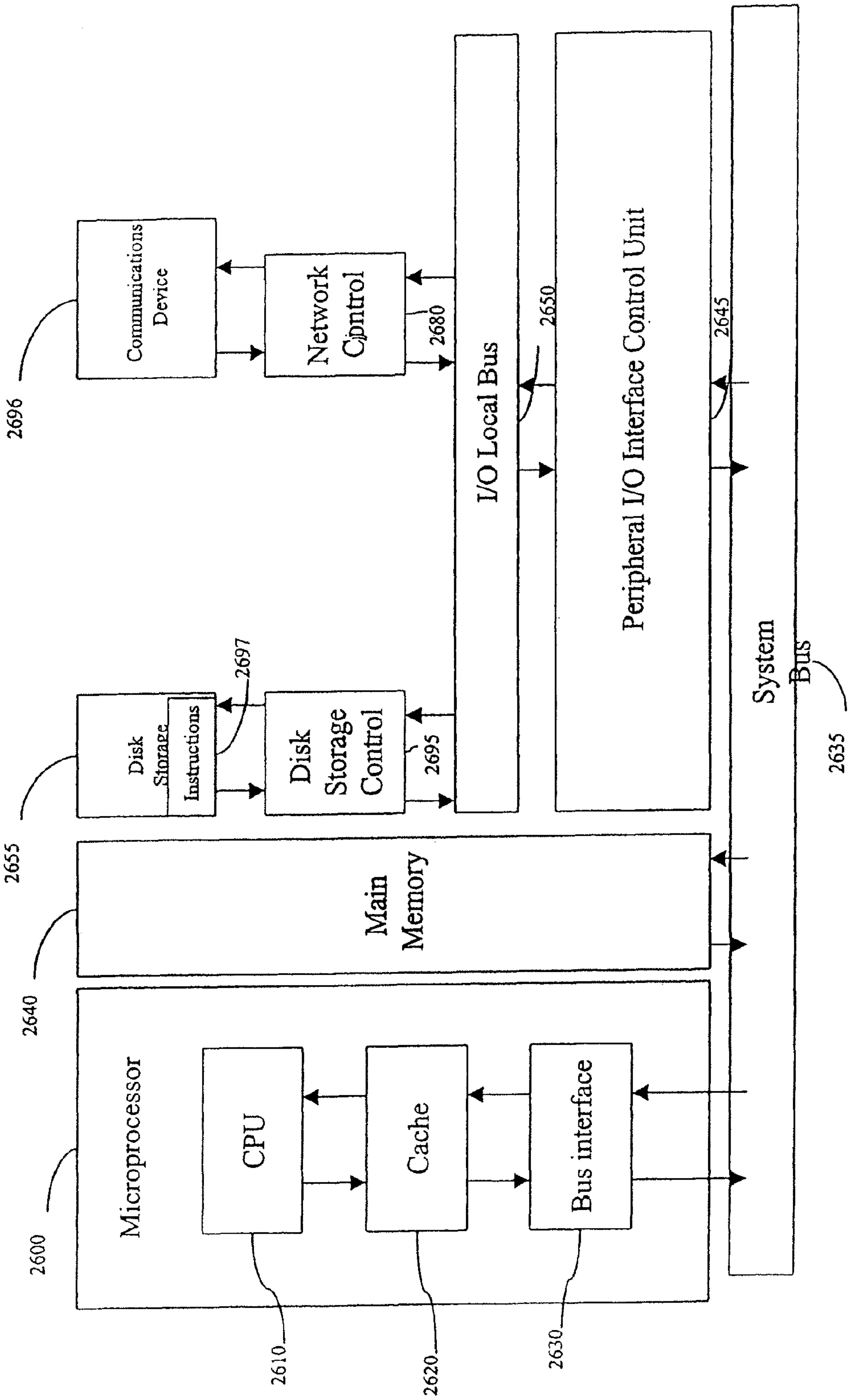
FIG. 8 is a hardware architecture diagram of a computing device suitable for use as a moderator server host in accordance with an exemplary embodiment of the present invention.

FIG. 8 is a hardware architecture diagram of a data processing system suitable for use as a moderator server host in accordance with an exemplary embodiment of the present invention. A data processing system includes a processor 2600, including a Central Processing Unit (CPU) 2610, a memory cache 2620, and a bus interface 2630, is operatively coupled via a system bus 2635 to a main memory 2640 and an I/O control unit 2645. The I/O interface control unit is operatively coupled via an I/O local bus 2650 to a disk storage controller 2695, and a network communications controller 2680. A communications device 2696 is operatively coupled to the network communications controller and is adapted to allow software objects hosted by the data processing system to communicate via a network with other software objects.

The disk storage controller is operatively coupled to a disk storage device 2655. Computer program instructions 2697 implementing a moderator server are stored on the disk storage device until the processor retrieves the computer program instructions and stores them in the main memory. The processor then executes the computer program instructions stored in the main memory to implement the moderator server.

Figure 9:
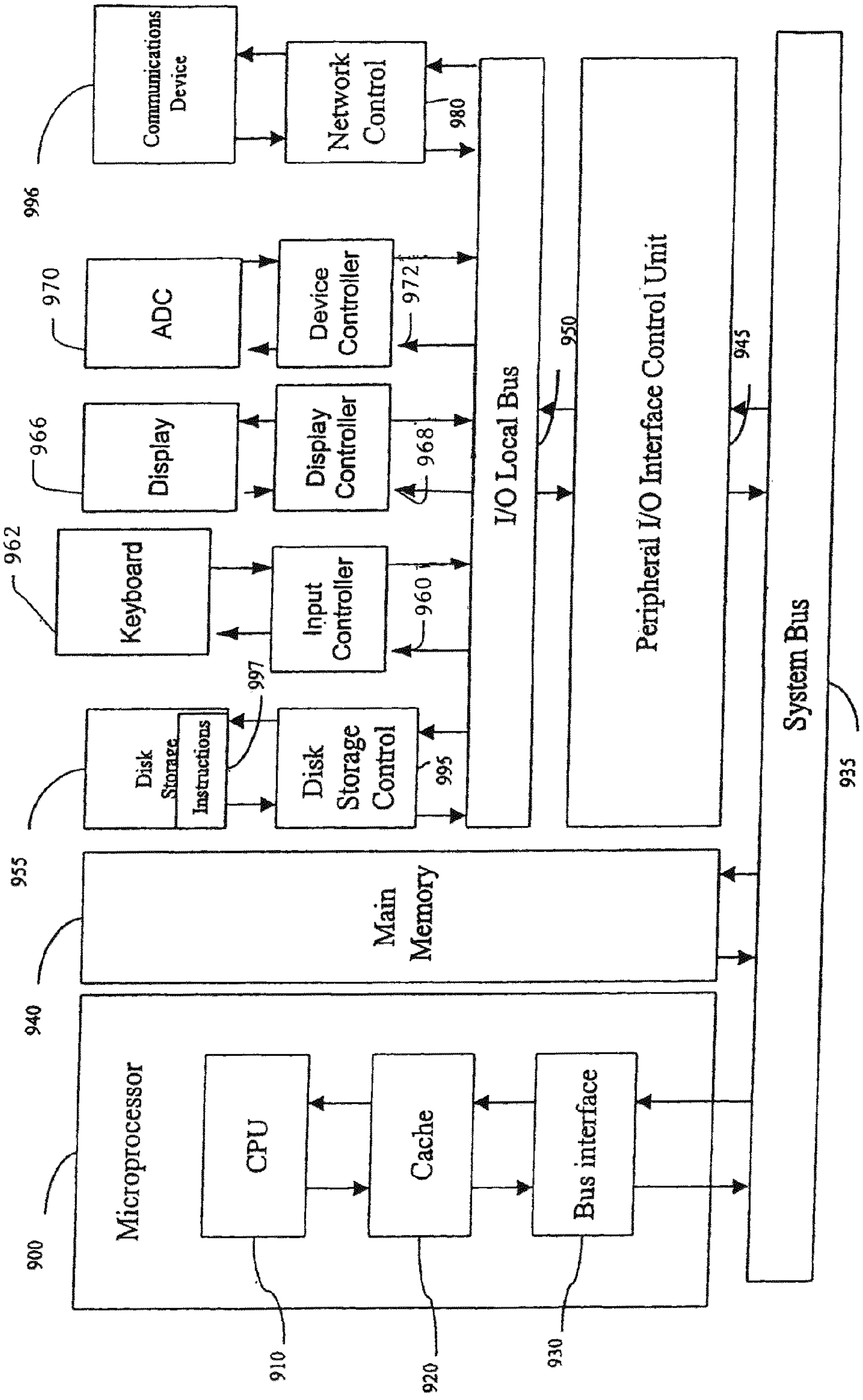
FIG. 9 is a hardware architecture diagram of a computing device suitable for use as a moderator client host in accordance with an exemplary embodiment of the present invention.

FIG. 9 is a hardware architecture diagram of a data processing system suitable for use as either a moderator client host or a participant client host in accordance with an exemplary embodiment of the present invention. A data processing system has a processor 900, including a Central Processing Unit (CPU) 910, a memory cache 920, and a bus interface 930, is operatively coupled via a system bus 935 to a main memory 940 and an I/O control unit 945. The I/O interface control unit is operatively coupled via an I/O local bus 950 to a disk storage controller 995, and a network communications controller 980. A communications device 996 is operatively coupled to the network communications controller and is adapted to allow software objects hosted by the data processing system to communicate through a network with other software objects.

An input controller 960 is operably coupled to the I/O local bus and a keyboard 962 or other user input devices. A moderator or a participant uses the keyboard or other user input devices to input information into the data processing system.

A display controller 968 operably coupled to the I/O local bus is also operably coupled to a user display 966 such as a CRT screen. The data processing system uses the display to display to the moderator previously described moderator user interface or to display to a participant a previously described participant user interface.

A device controller 972 operably coupled to the I/O local bus is also operably coupled to an ADC 970. The data processing system uses the ADC to receive and digitize a previously described audio source so that the digitized audio source may be transmitted to a previously described moderator server.

The disk storage controller is operatively coupled to a disk storage device 955. Computer program instructions 997 implementing a previously described moderator client are stored on the disk storage device until the processor retrieves the computer program instructions and stores them in the main memory. The processor then executes the computer program instructions stored in the main memory to implement the moderator client or the participant client.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A user interface for a moderator client, for use by a moderator of an interactive radio program and corresponding audio portion, the moderator client comprising a display device, the user interface comprising:

a participant comments portion for display of comments on the display device made by participants in the interactive radio program; and a question display portion for display of a plurality of questions on the display device asked by the participants in the interactive radio program, the question display portion comprising a corresponding distinct plurality of question fields, each one of the question fields comprising:

a participant name subfield for displaying a name of a corresponding one of the participants asking a corresponding one of the questions;

a question text subfield adjacent to the participant name subfield and for displaying the corresponding one of the questions;

an answer selection icon for marking the corresponding one of the questions as a question that the moderator will answer as part of the interactive radio program; and a delete selection icon for deleting the one of the question fields from the question display portion, wherein the user interface is configured to permit the moderator to select a participant question from the plurality of questions to answer while viewing the participant comments on the display device, and wherein the audio portion is transmitted through a radio network.

2. The user interface of claim 1, wherein the participant comment portion further includes:

a plurality of participant comment records, each participant comment record including:

a participant name field; and a participant comment field.

3. The user interface of claim 1, further comprising an audience approval rating display portion, wherein the user interface is further configured to permit the moderator to view an audience approval rating submitted by the participants in the interactive radio program.

4. The user interface of claim 3, wherein the audience approval rating display portion further includes:

a color-coded meter for display of a current audience approval rating submitted by the participants in the interactive radio program; and a time graph for display of a plurality of audience approval ratings as a function of time, the plurality of audience approval ratings being submitted by the participants in the interactive radio program over a period of time.

5. The user interface of claim 1, further comprising a status indicator portion indicating a status of the interactive radio program, wherein the user interface is further configured to permit the moderator to view statistics about the interactive radio program.

6. The user interface of claim 5, wherein the status indicator portion further includes:

a number field for displaying a sequence number associated with the interactive radio program;

a name field for display of a name associated with the interactive radio program; and an online audience display field for display of a number of participants currently participating in the interactive radio program.

7. The user interface of claim 1, further comprising a participant poll display portion for display of poll results received from the participants in the interactive radio program, wherein the user interface is further configured to permit the moderator to view a poll question along with responses by the participants in the interactive radio program.

* * * * *